US009013896B2

(12) United States Patent
Thomas et al.

(10) Patent No.: US 9,013,896 B2
(45) Date of Patent: Apr. 21, 2015

(54) APPARATUS, SYSTEMS AND METHODS FOR POWER SUPPLY EMPLOYING SINGLE-STAGE FORWARD VOLTAGE CONVERSION

(75) Inventors: Jose Palathra Thomas, Orange, CA (US); Sam Chaisitti, Westminster, CO (US); Priyanka Rajan Rele, San Jose, CA (US); Jorge Enrique Lugo Nevarez, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 688 days.

(21) Appl. No.: 13/333,488

(22) Filed: Dec. 21, 2011

(65) Prior Publication Data
US 2012/0170322 A1 Jul. 5, 2012

Related U.S. Application Data

(60) Provisional application No. 61/428,630, filed on Dec. 30, 2010.

(51) Int. Cl.
*H02M 3/335* (2006.01)
*H02M 1/00* (2006.01)

(52) U.S. Cl.
CPC .. *H02M 3/33569* (2013.01); *H02M 2001/0003* (2013.01)

(58) Field of Classification Search
CPC ................. H02M 3/33576; H02M 3/33592

USPC ........ 363/15, 16, 17, 21.03, 21.06, 21.14, 74, 363/127
See application file for complete search history.

(56) References Cited

U.S. PATENT DOCUMENTS

| 4,723,098 | A * | 2/1988 | Grubbs ........................ 363/74 |
|---|---|---|---|
| 5,528,480 | A * | 6/1996 | Kikinis et al. .................. 363/15 |
| 5,991,171 | A * | 11/1999 | Cheng ........................ 363/21.03 |
| 6,038,150 | A * | 3/2000 | Yee et al. ...................... 363/127 |
| 6,243,278 | B1 * | 6/2001 | Jacobs ........................ 363/127 |
| 6,788,554 | B2 * | 9/2004 | Havanur .................... 363/21.06 |
| 7,667,986 | B2 * | 2/2010 | Artusi et al. ................... 363/16 |
| 2006/0208719 | A1 * | 9/2006 | Librizzi ....................... 323/288 |

* cited by examiner

*Primary Examiner* — Matthew Nguyen
*Assistant Examiner* — Jye-June Lee
(74) *Attorney, Agent, or Firm* — Lowe Graham Jones PLLC

(57) ABSTRACT

A method of supplying direct-current (DC) power is presented herein. In the method, a first electrical signal and a second electrical signal are received. The first electrical signal alternates between a high voltage and a low voltage according to a constant duty cycle. The second electrical signal is synchronized with the first electrical signal. The first electrical signal is gated using the second electrical signal to produce a gated electrical signal with a duty cycle less than the duty cycle of the first electrical signal. The gated electrical signal is filtered to generate a DC output voltage. A difference between the generated DC output voltage and a reference DC voltage is determined. The duty cycle of the gated electrical signal is controlled by controlling the gating of the first electrical signal based on the difference.

22 Claims, 14 Drawing Sheets

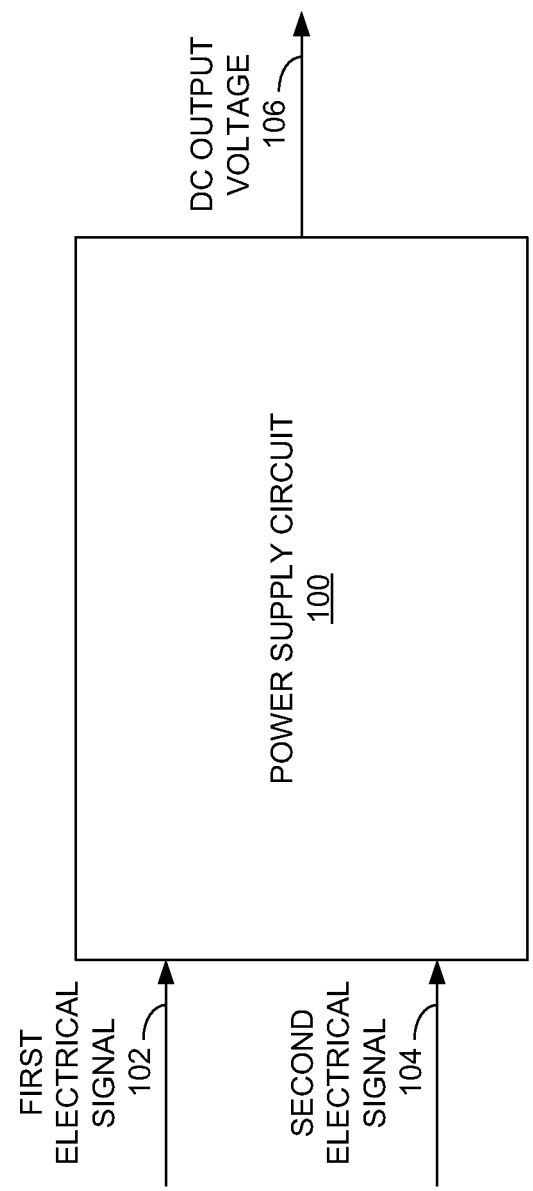

APPARATUS, SYSTEMS AND METHODS FOR POWER SUPPLY EMPLOYING SINGLE-STAGE FORWARD VOLTAGE CONVERSION

CROSS REFERENCE TO RELATED APPLICATIONS

This application claims the benefit of and priority to co-pending U.S. utility application entitled, "Power Supply Employing Single-Stage Forward Voltage Conversion," having application Ser. No. 61/428,630. filed Dec. 30, 2010. and which is entirely incorporated herein by reference.

BACKGROUND

Power supply circuits, such as those incorporated into the electrical designs of most everyday electronic devices, including, but not limited to, televisions, television set-top boxes, audio receivers, Compact Disc (CD) and Digital Versatile Disk (DVD) players, standalone digital video record recorders (DVRs), and desktop computers, are tasked with converting an input alternating-current (AC) voltage into multiple direct-current (DC) power voltages for various components within the device. Generally, this conversion involves a two-step process, wherein the input AC voltage (typically 110 volts AC in the United States) is first converted into a single, relatively-high DC voltage, such as 15-20 volts DC, in a first conversion stage. This first stage normally employs a sizeable transformer for the storage of energy to be consumed in a second conversion stage.

In the second conversion stage, the high DC voltage is then converted into the several low-level DC power voltages required by the device circuitry, such as, for example, 3.3 volts DC, 2.5 volts DC, 1.8 volts DC, and 1.2 volts DC, due to the varied power supply requirements of the circuits typically utilized in the device. In many cases, one low-level DC output voltage, such as a 5.0 volt DC output, is employed to generate the other lower-level DC output voltages. In such situations, the power supply may exhibit a negative resistance effect, in which the low-level DC output voltage cannot provide the peak current required for the other output voltages. To counteract this effect, the power supply normally employs a significant amount of capacitance at the output of the first stage, and possibly at the outputs of the second stage, so that the peak current requirements of the all of the output voltages are satisfied.

Normally, the output levels of the various DC output voltages must be maintained within a relatively narrow voltage range to allow the components employing these voltages to operate properly. To address this requirement, the power supply circuit oftentimes is designed to monitor the output of the high-level DC voltage level, and alter the operation of the portion of the power supply circuit performing the first level of voltage conversion as a result of the monitoring operation in order to maintain an acceptable voltage level for the high-level DC voltage and the subsequent lower DC voltages used in the device.

In some power supplies as described above, an additional circuit stage is utilized for power factor correction. This stage normally takes the form of a boost "chopper" or converter used to regulate the output voltage, as well as to ensure that the output current is aligned in-phase with the output voltage. As boost converters are prone to produce electromagnetic interference (EMI), a two-stage EMI filter is normally incorporated into such a power supply to reduce any possible high-ripple current at the input of the boost converter and thus diminish EMI. In many low power conversion power supplies, a flyback converter is utilized at the output stage to provide a cost-effective solution that also improves the power factor of the power supply.

SUMMARY

Systems and methods of supplying direct-current (DC) power are disclosed. An exemplary embodiment receives a first electrical signal alternating between a high voltage and a low voltage according to a constant duty cycle; receives a second electrical signal synchronized with the first electrical signal; gates the first electrical signal using the second electrical signal to produce a gated electrical signal with a duty cycle less than the duty cycle of the first electrical signal; filters the gated electrical signal to generate a DC output voltage; determines a difference between the generated DC output voltage and a reference DC voltage; and controls the duty cycle of the gated electrical signal by controlling the gating of the first electrical signal based on the difference.

In accordance with further aspects, an exemplary multiple-output-voltage direct-current (DC) power supply embodiment has a plurality of DC power circuits, wherein each of the power circuits is configured to receive a first electrical signal periodically alternating between a high voltage and a low voltage according to a constant duty cycle, to receive a second electrical signal synchronized with the first electrical signal, to generate a separate DC output voltage based on the first electrical signal and the second electrical signal, and to regulate the voltage level of the separate DC output voltage; and a driving circuit configured to generate the first electrical signal and the second electrical signal.

BRIEF DESCRIPTION OF THE DRAWINGS

Preferred and alternative embodiments are described in detail below with reference to the following drawings:

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

FIG. 1 is a simplified block representation of an embodiment of a power supply circuit.

DETAILED DESCRIPTION

Figure 1A:
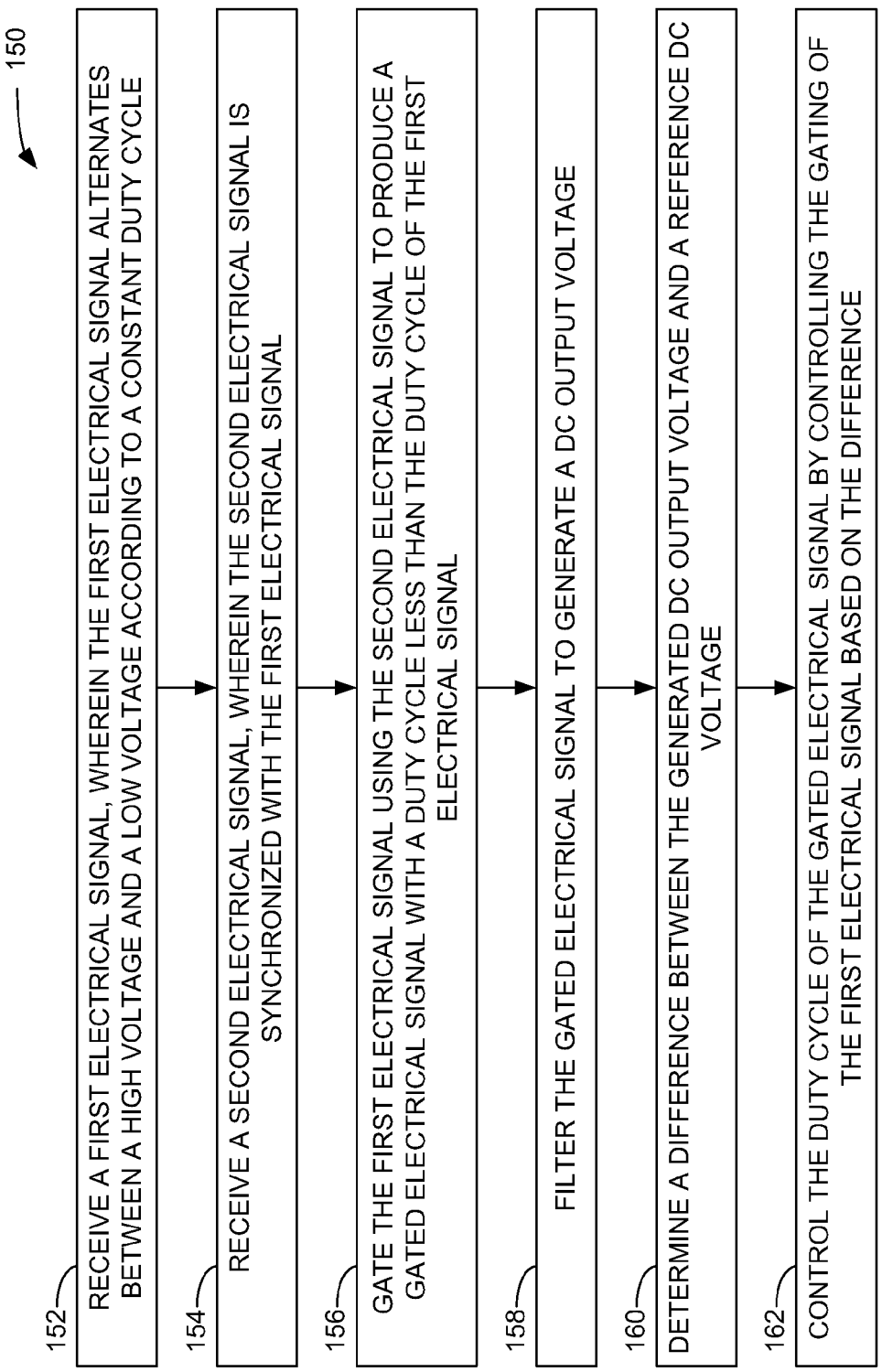
FIG. 1A is a flow diagram of a method according to an embodiment that supplies direct-current (DC) power via the power supply circuit of FIG. 1.

The enclosed drawings and the following description depict specific example embodiments to teach those skilled in the art how to make and use the best mode of the invention. For the purpose of teaching inventive principles, some conventional aspects have been simplified or omitted. Those skilled in the art will appreciate variations of these embodiments that fall within the scope of the disclosure. Those skilled in the art will also appreciate that the features described below can be combined in various ways to form multiple embodiments. As a result, embodiments are not limited to the specific embodiments described below, but only by the claims and their equivalents.

FIG. 1 depicts an example embodiment of a power supply circuit 100. In one example, the power supply circuit 100 may be incorporated into any electronic device requiring a DC power supply voltage, such as, for example, a television, a television receiver or "set-top box" capable of receiving television or other audio/video signals via satellite, cable, or terrestrial antenna, audio receiving and amplifying equipment, a CD or DVD player, a computer, one any one of various household appliances. In other examples, the power supply circuit 100 may be located external to such a device, such as in a separate enclosure or chassis. Also, as is described in greater detail below, the power supply circuit 100 may be employed alone, or in tandem with other power supply circuits 100, along with a driving circuit configured to generate a first electrical signal 102 and a second electrical signal 104, employed as input to the power supply circuit 100 in order to generate a DC output voltage 106. Various possible characteristics of the first electrical signal 102 and the second electrical signal 104 are described more fully hereinafter.

FIG. 1A presents a method 150 of supplying DC power using, for example, the power supply circuit 100 of FIG. 1. In the method 150, the first electrical signal 102 is received (operation 152). The first electrical signal 102 alternates between a high voltage and a low voltage according to a constant duty cycle. The power supply circuit 100 also receives the second electrical signal 104 (operation 154), which is synchronized with the first electrical signal 102. The first electrical signal 102 is gated using the second electrical signal 104 to produce a gated electrical signal with a duty cycle less than the duty cycle of the first electrical signal 102 (operation 156). The gated electrical signal is filtered to generate the DC output voltage 106 (operation 158). A difference between the generated DC output voltage 106 and a reference DC voltage is determined (operation 160). The duty cycle of the gated electrical signal is controlled by controlling the gating of the first electrical signal 102 based on the difference (operation 162).

As a result of employing the method 150 in at least some embodiments, the generated DC output voltage 106 is maintained within acceptable limits without manipulating or otherwise affecting the first electrical signal 102 being employed to generate the DC output voltage 106. As a consequence, multiple such power supply circuits 106, each configured to generate a different DC output voltage 102, may be driven by way of a single first electrical signal 102 with assistance from the second electrical signal 104 being utilized as a synchronization signal. Such a configuration represents a single-stage conversion from an AC input voltage to a DC output voltage. Additionally, output voltage adjustment is performed locally at each power supply circuit 100, allowing for faster, more accurate monitoring and correction of the DC output voltage 106. Additional advantages may be recognized from the various embodiments discussed in greater detail below.

Figure 2:
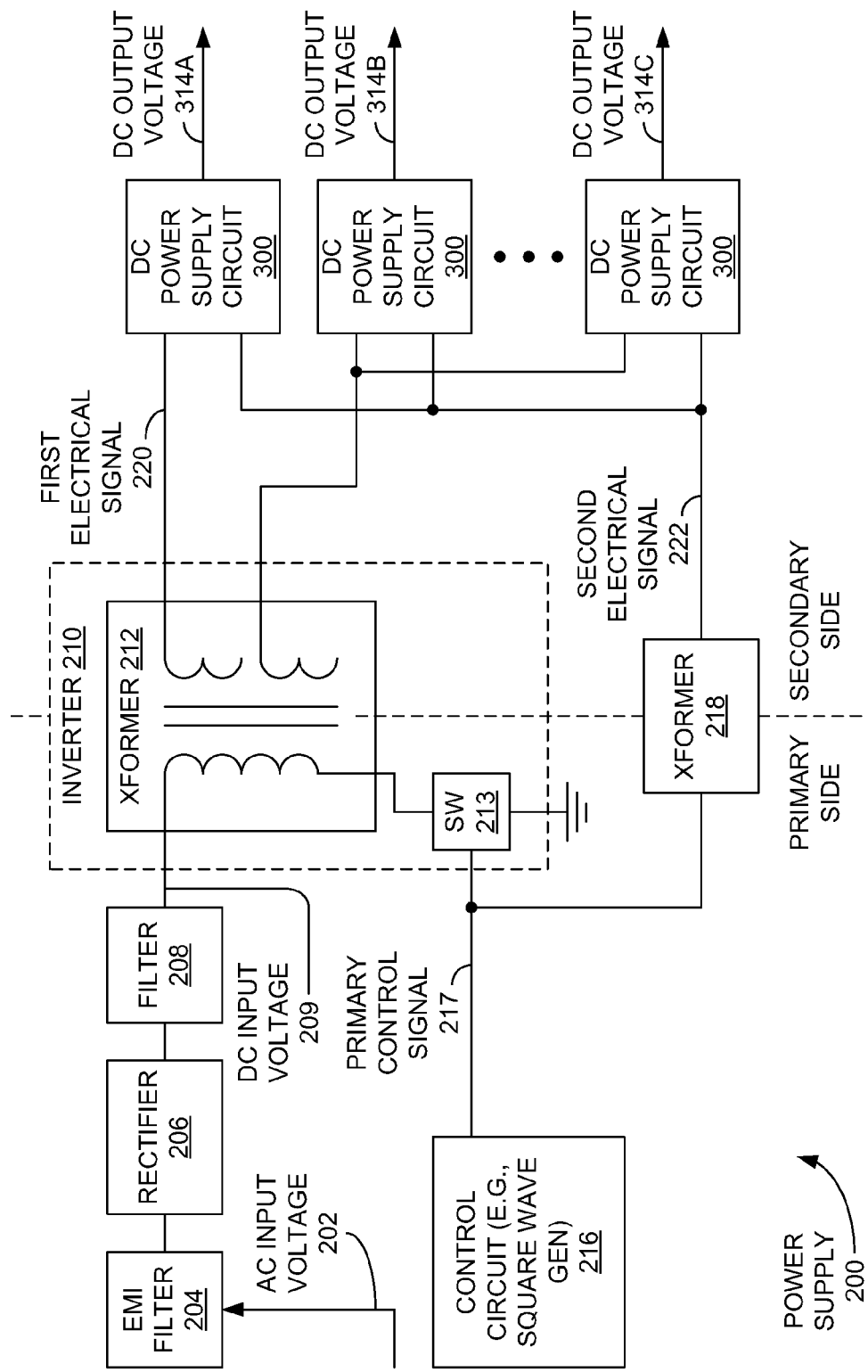
FIG. 2 is a block diagram of a multiple-output-voltage DC power supply employing multiple instances of the example embodiments of the DC power supply circuit of FIGS. 1 and 3.

FIG. 2 depicts an example of a power supply 200 providing multiple DC power supply circuits 300, wherein each DC power supply circuit 300 provides a different DC output voltage 314A, 314B, 314C for a particular circuit of an electronic device. Thus, each of the DC power supply circuits 300 is configured differently to provide its own DC output voltage 314, as is described more fully below. Each of the DC power supply circuits 300 may represent an embodiment of the power supply circuit 100 of FIG. 1, and each is shown in greater detail in FIG. 3. Each of the DC power supply circuits 300 in FIG. 3 receives a first electrical signal 220 and a second electrical signal 222, the characteristics of which correspond to the first electrical signal 102 and the second electrical signal 104 described above in relation to the power supply circuit 100 of FIG. 1. The remainder of the power supply 200 is configured to generate the first electrical signal 220 and the second electrical signal 222.

As shown in FIG. 2, the power supply 200 is driven by an AC input voltage 202. In this particular embodiment, the AC input voltage 202 is a 110 volt AC, 60 Hz single-phase signal normally provided via a power line supplied by an electrical power utility in business and home environments. Of course, the AC input voltage 202 may possess alternative voltage and frequency characteristics in other embodiments, such as those power signal characteristics that are prevalent in countries outside of the United States. Generally speaking, the AC input voltage 202 is processed to produce a DC input voltage 209, which processed via inverter 210 to produce the first electrical signal 220, which is an AC signal that alternates between low and high voltages according to a predetermined duty cycle, and that is gated or chopped to generate a number of DC output voltages.

To generate the DC input or bus voltage 209, the AC input voltage 202 is input to a rectifier 206 and filter 208. In one embodiment, the rectifier 206 is a full wave diode-bridge rectifier, although a half-wave rectifier or other rectifier circuit may be utilized in other arrangements. The filter 208 may include, for example, a low-pass filter configured to generate the DC input voltage 209 from a rectified AC voltage signal. The filter 208 may include, for example, one or more bulk capacitors of sufficient size to filter remaining AC components of the rectified AC signal received from the rectifier 206, and to provide short-term energy storage for maintaining the DC input voltage 209 as it is switched across the transformer 212, as is described below. The filter 208 may provide other filtering or energy storage functions as well.

Figure 2A:
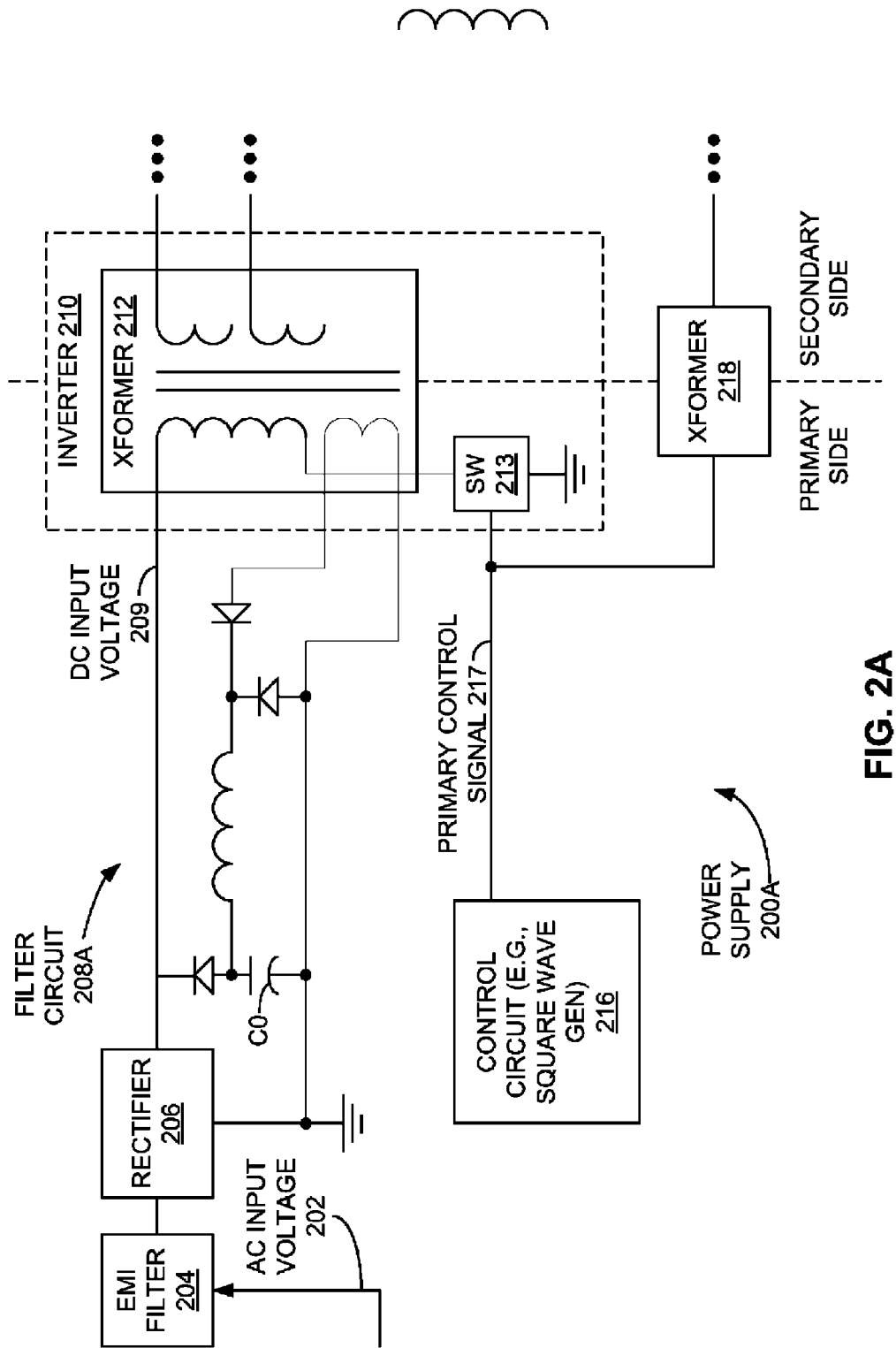
FIG. 2A is a block diagram of a multiple-output-voltage DC power supply similar to the power supply of FIG. 2, in which a filter circuit improves the input power factor of the power supply.

In another embodiment, the bulk capacitor for the filter circuit 208 may be replaced with a filter circuit 208A depicted in FIG. 2A. In this case, an external voltage source derived from the transformer 212 having a voltage of about 50 percent of the peak voltage of the AC input voltage 202 is developed across a capacitor C0. This implementation of the filter circuit 208A helps minimize third-harmonic content across the primary side of the transformer 212, thus providing an improved power factor in the power supply 200A. Generally, the third harmonic is more prominent at 30 degrees of a sine waveform. Since sin 30°=0.5. the voltage across the capacitor C0 is held at about half of the peak voltage of the AC input voltage 202 to mitigate the effects of the third harmonic. As a result, the output at the secondary side of the transformer 212 exhibits a 50 percent duty cycle and follows the AC input voltage 202 sine wave, with a minimum voltage amplitude of 50 percent of the peak of the AC input voltage 202 divided by the turn ratio of the primary and secondary windings of the transformer 212.

In some embodiments, prior to the rectifier 206 and the filter 208, the AC input voltage 202 may be processed via an electromagnetic interference (EMI) filter 204 to filter voltage noise, spikes, and other electrical transients from the AC input signal 202 prior to the subsequent processing performed via the rectifier 206 and the filter 208. The EMI filter 204 may help prevent the transmission of noise from the power supply 200 to other nearby electronic circuits and devices according to applicable safety and operational regulatory requirements. Additionally, such filtering may also protect the power supply 200 and the attached electronic circuitry. In one example, the EMI filter 204 includes common mode chokes, X capacitors (coupled across the AC input voltage line 202), and Y capacitors (coupled from the input voltage line 202 to a chassis of the device incorporating the supply 200). In one implementation, the EMI filter 204 is designed to satisfy CISPR (Comite International Special des Perturbations Radioelectriques, or Special International Committee on Radio Interference) Class B requirements. In some embodiments, the size of the EMI filter 204 may be reduced, depending on the particular environment in which the power supply circuit 200 is to be operated.

To generate the first electrical signal 220 from the DC input voltage 209, the first electrical signal 220 is presented to a terminal of a primary winding of a transformer 212. A control circuit 216 is employed to generate a primary control signal 217 to drive a switch 213 coupling the opposing terminal of the primary winding of the transformer 212 to a ground reference (or other reference voltage). In one embodiment, the primary control signal 217 is a square wave generated by the control circuitry 216 operating at a 50 percent duty cycle and a frequency of approximately 150 kHz, although alternative frequencies and duty cycles may be employed in other implementations. The switch 213 may include one or more transistors, such as metal-oxide-semiconductor field-effect transistors (MOSFETs) or some other switch configuration capable of periodically switching the DC input voltage 209 across the primary winding of the transformer 212. Some embodiments of the inverter 210 may employ dithering to spread the resulting noise over a spectrum band, while others may use sinusoidal pulse-width modulation (SPWM) to facilitate an improved power factor for the supply 200. In addition, a current transformer (not shown in FIG. 2) may be connected in series with the main transformer 212 to provide pulse-by-pulse current limiting with slow compensation to protect against over current or short-circuit conditions.

The transformer 212 provides electrical isolation between the power line providing the AC input voltage 202 and the potentially sensitive circuitry embodied in the DC power supply circuits 300 and the components of the device being supplied with the power from the supply circuits 300. Thus, voltage spikes and other maladies that may occur on the power line may be prevented from damaging the electronic components coupled to the secondary side of the transformer 212. The transformer 212 is configured to generate a lower voltage amplitude for the first electrical signal 220 than the signal being formed across the primary winding via the switch 213, as determined by the winding or turn ratio of the primary and secondary windings.

The particular example of FIG. 2 shows multiple secondary windings for the transformer 212, which results in multiple first electrical signals 220, although other embodiments may employ a single secondary winding. Each secondary winding may employ a different number of windings or turns, so that each secondary winding may exhibit a separate first electrical signal 220 having substantially identical timing characteristics, but different voltage amplitudes. Such a structure may aid in providing a wide range of DC output voltages for varying electronic component power needs. For example, a smaller number of turns for a secondary winding may be appropriate for low DC voltages in the range of 1.2 to 3.3 volts DC, while a higher number of turns for another secondary winding may be conducive to generating higher voltages, such as 5-24 volts DC. The lower voltages may be applicable to microprocessors and associated logic circuitry, while the higher voltages may be more appropriate for electromechanical devices (such as, for example, magnetic and optical disk drives) and radio-frequency components (including low noise block converters (LNBs) associated with satellite television receivers).

In some implementations, the multiple secondary windings may be designed such that each of the output DC-to-DC converters (i.e., the DC power supply circuits 300) operate at a duty cycle of approximately 25% to 40%. The desired transformer output (tapping) voltage for a particular output voltage can be calculated by multiplying the transformer tapping voltage by the desired duty cycle. For example, for a 1.2 volt DC output, a 25% duty cycle would require a 4.8 volt tapping voltage (0.25×4.8 volts=1.2 volts), while a 40% duty cycle would involve a 3.0 volt tapping voltage (0.40×3.0 volts=1.2 volts). Similarly, a 3.3 volt DC output would involve a transformer tapping voltage of 13.2 volts (for a 25% duty cycle) to 8.25 volts (for a 40% duty cycle).

The primary control signal 217 is also employed indirectly as the second electrical signal 222 used by the DC power supply circuits 300 to open a gating window for the first electrical signal 220. In the example shown in FIG. 2, the primary control signal 217 is isolated from the second electrical signal 222 via a second transformer 218 (sometimes called a pulse transformer) to protect secondary side of the power supply 200 from the primary portion. In accordance with the embodiments of the DC power supply circuit 300 discussed above, the second electrical signal 222 designates the start of each pulse of the first electrical signal 220 so that each DC power supply circuit 300 is notified as to when the gating window for the first electrical signal 220 is to be opened. In another embodiment, the second electrical signal 222 is not limited in such a fashion, and may exhibit different duty cycles and other signal characteristics, as long as the second electrical signal 222 designates the beginning of the gating window.

Figure 3:
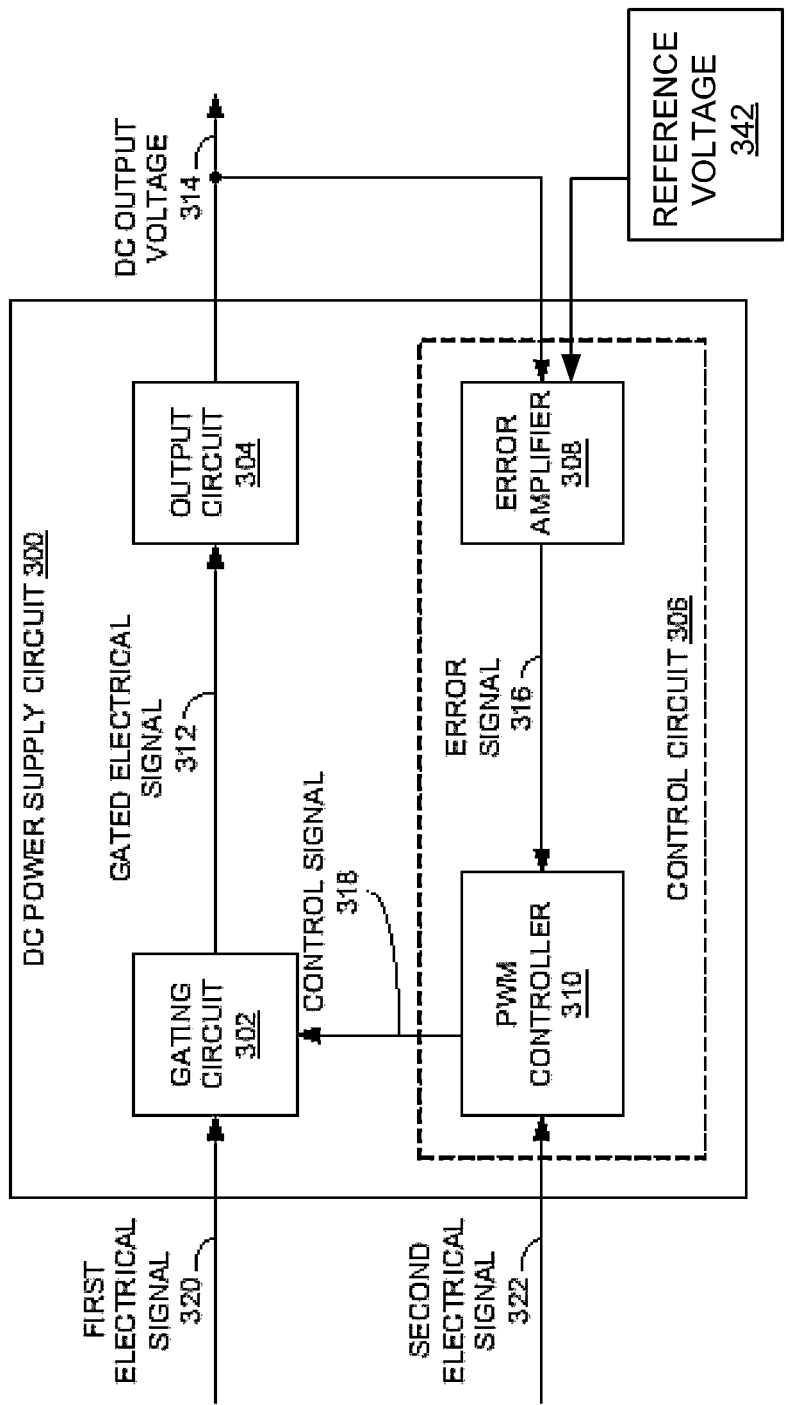
FIG. 3 is a block diagram of an embodiment of a DC power supply circuit.

FIG. 3 is a block diagram of a DC power supply circuit 300, which represents a more detailed example of the power supply circuit 100 of FIG. 1 and the DC signal 316. The resulting difference voltage may also be amplified before being output from the error amplifier as the error signal 316. power supply circuits 300 of FIG. 2. In the following examples, the DC power supply circuit 300 may be referred to as a "buck-derived synchronous rectifier". As shown, the DC power supply circuit 300 includes a gating circuit 302, an output circuit 304, and a control circuit 306. More specifically, the control circuit 306 may include an error amplifier 308 and a pulse-width-modulation (PWM) controller 310.

The gating circuit 302 (also referred to as a "buck-derived chopper") receives the first electrical signal 302 (which may be referred to as the chopper switching waveform), and gates or "chops" the first electrical signal 102 according to a control signal 318 generated by the PWM controller 310 to produce a gated electrical signal 312. In turn, as described more completely below, the PWM controller 310 generates the control signal 318 on the basis of the second electrical signal 322 and an error signal 316. More specifically, the width of each pulse of the control signal 318 specifies the width of a gating window through which the first electrical signal 320 is allowed to pass as the gated electrical signal 312. Further, by modulating the pulse width of the control signal 318 according to the value of the error signal 316 received from the error amplifier 308, the proper voltage level for the DC output voltage 314 may be maintained.

The output circuit 304 processes the gated electrical signal 312 to generate the DC output voltage 314. The output circuit 304 utilizes a low-pass filter, such as an L-C (inductor-capacitor) filter to filter the AC component of the gated electrical signal 312, thus transforming the gated electrical signal 312 into the DC output voltage 314. The output circuit 304 may also include one or more additional capacitors to aid in stabilizing the DC output voltage 314 in the case of a demanding time-varying load coupled to the DC output voltage 314. The output circuit 304 may also include other circuitry for conditioning and/or stabilizing the DC output voltage 304.

To monitor the voltage level of the DC output voltage 314, the DC output voltage 314 may be coupled with the error amplifier 308 of the DC power supply circuit 300. In one example, the error amplifier 308 compares the DC output voltage 314, or some fraction thereof, with a stable reference voltage 342. This comparison may occur by way of a differential amplifier or other similarly capable circuit. Further, the error amplifier 308 may integrate the difference between the reference voltage 342 and the output voltage 314 to generate the error signal 316. The resulting difference voltage may also be amplified before being output from the error amplifier as the error signal 316.

In the PWM controller 310, the amplitude, and possibly the polarity, of the error signal 316, indicates to the PWM controller whether the current pulse width of the control signal 318 should be shorted or lengthened, and by how much. Therefore, the PWM controller 310 in essence may track the current pulse width of the control signal 318, which specifies the width of a gate window 402 (shown in FIG. 4) for passing the first electrical signal 320 as the gated electrical signal 312. Further, the PWM controller 310 modulates the pulse width on a continual basis in response to the feedback received via the error signal 316. In addition, the start of each gate window 402 mentioned above is determined by a corresponding voltage transition of the second electrical signal 322, thus synchronizing the control signal 318 with the first electrical signal 320.

Figure 3A:
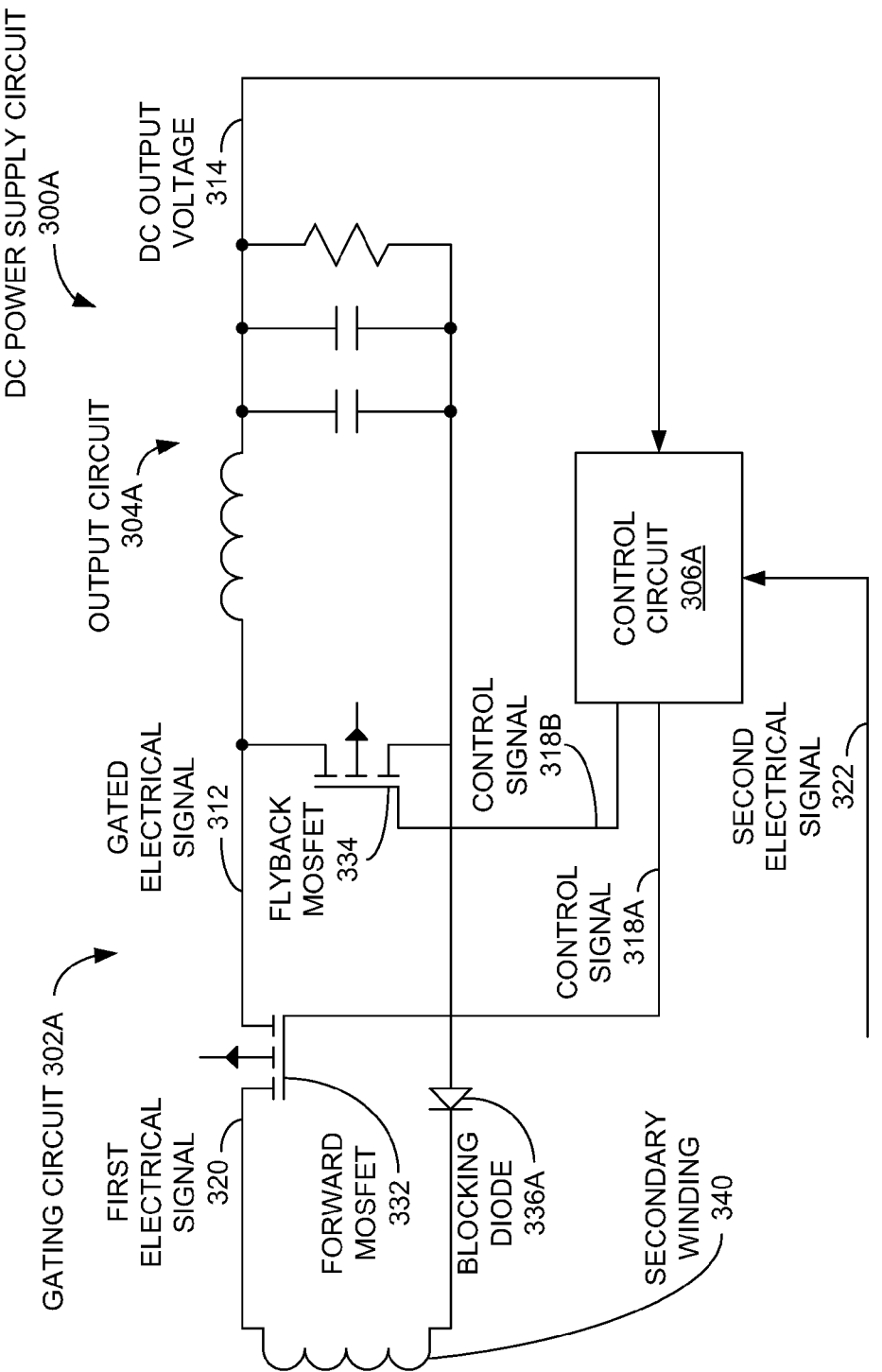
FIGS. 3A and 3B are two possible schematic diagrams of an embodiment of the DC power supply circuit of FIG. 3.
Figure 3B:
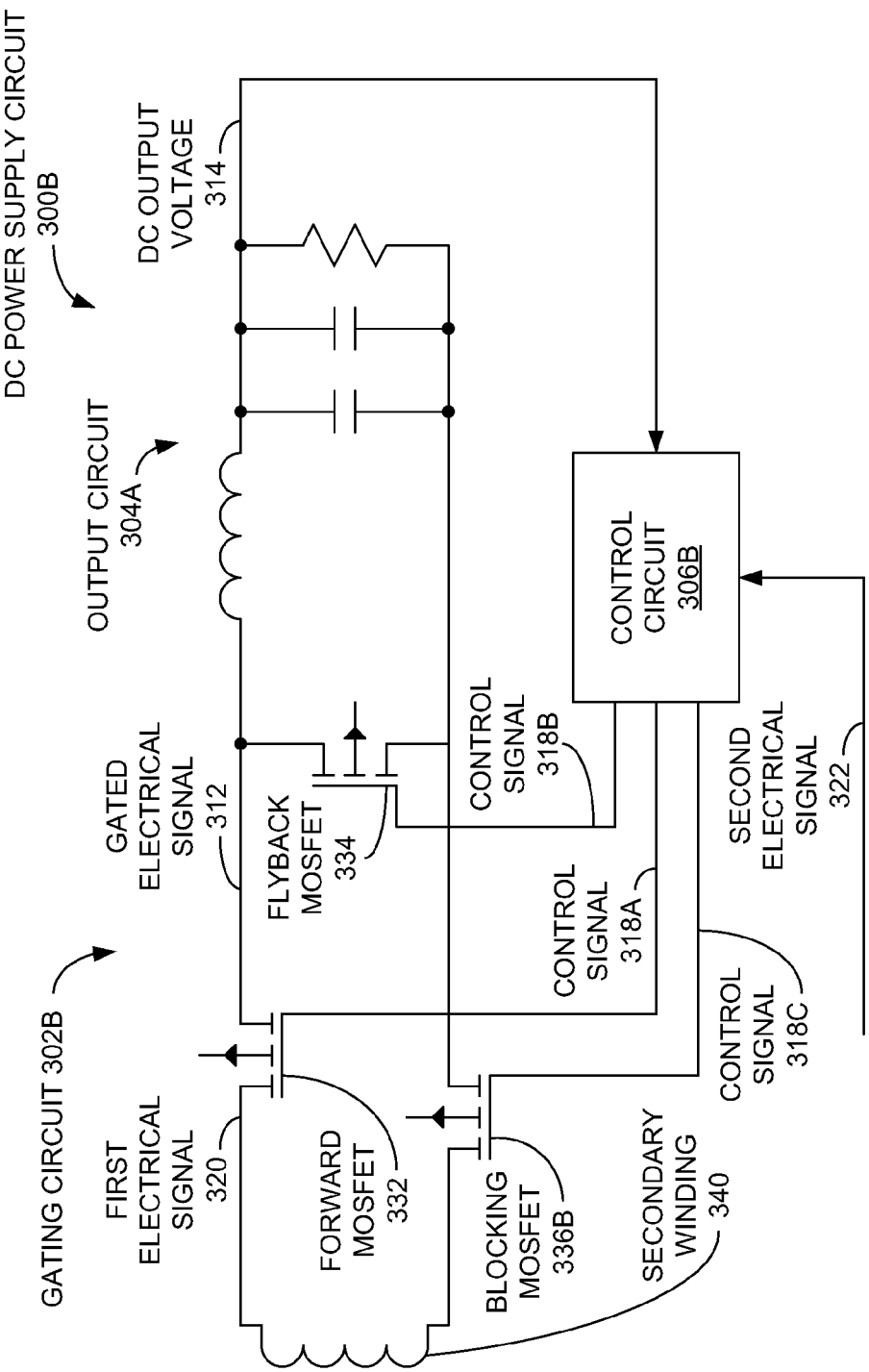

FIGS. 3A and 3B provide embodiments 300A, 300B of the DC power supply circuit 300 that include more details regarding the gating circuit 302. In the implementation of FIG. 3A, the gating circuit 302A includes a forward MOSFET 332, a flyback MOSFET 334, and a blocking diode 336A. Each of the forward MOSFET 332 and the flyback MOSFET 334 is driven by way of a control signal 318A and a control signal 318B, respectively, which are generated in the control circuit 306A. In the embodiment of FIG. 3B, the blocking diode 336A is replaced with a blocking MOSFET 336B which is driven by a separate control signal 318C.

Continuing with FIG. 3B, due to the operation of the switch 213 (depicted in FIG. 2), an AC voltage is developed across the primary winding of the main transformer 212, which is then transferred to the secondary winding 340 (as shown in FIG. 3). Due to leakage inductance of the primary winding, the voltage on the second winding 340 becomes negative when the switch 213 is off. To block the negative voltage emanating from the secondary winding 340, the control signal 318C turns the blocking MOSFET 336B on and off in synchronization with the switch 213 of FIG. 2. The blocking diode 336A of FIG. 3A essentially performs this function without an explicit control signal. However, the use of the blocking MOSFET 336B may decrease conduction loss, and thus improve efficiency of the power supply circuit 300 over the use of the blocking diode 336A. Use of the blocking MOSFET 336B over the blocking diode 336A may depend on the output voltage 314A to be produced, the current requirements at the output, and other factors.

The control signal 318A turns the forward MOSFET 332 on in synchronization with the primary-side switch 213, and turns the forward MOSFET 332 off according to the proper duty cycle determined by the control circuit 306A to generate the desired DC output voltage 314A. The control signal 318B operates in complementary fashion to the control signal 318A during normal operation, thus turning the flyback MOSFET 334 on when the forward MOSFET 332 is turned off, and vice-versa.

In some implementations, the flyback MOSFET 334 may also be turned off during the "turn on" and "turn off" phases of the power supply 200, and also until the output current reaches its rated ripple current, to increase the overall efficiency of the DC power supply circuit 300A, 300B. Furthermore, different techniques of switching any of the MOSFETS 332, 334, 336B of the gating circuit 302A, 302B a few nanoseconds earlier or later compared to the primary switch 213 may be utilized to reduce switching losses that may be experienced.

Figure 4:
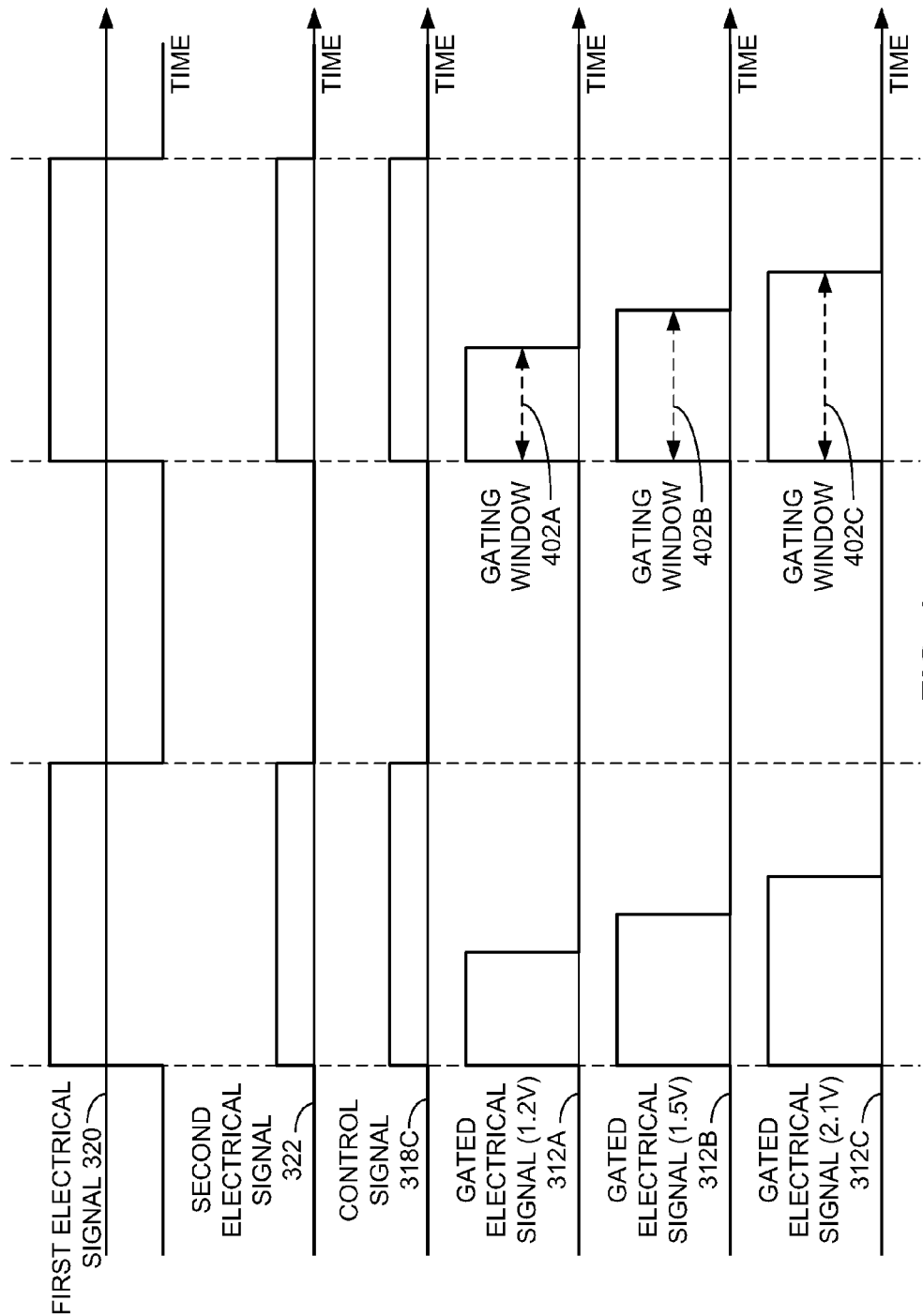
FIG. 4 is a set of timing diagrams of electrical signals related to example embodiments of the DC power supply circuit of FIGS. 3A and 3B.

FIG. 4 illustrates some of the signals utilized in the operation of the DC power supply circuit 300 of FIG. 3, the DC power supply circuit 300A of FIG. 3A, and the DC power supply circuit 300B of FIG. 3B. As shown therein, the first electrical signal 320 is a 50 percent duty cycle square wave voltage signal, although other duty cycle values may be utilized for the first electrical signal 320 in other implementations. Further, in one example, the first electrical signal 320 may exhibit a frequency of approximately 150 kilohertz (kHz) and an amplitude of 15 volts DC. In other implementations, other frequencies and amplitudes, including higher frequencies and voltage amplitudes, may be employed in other implementations while remaining within the scope of the disclosure. Generally, the amplitude of the first electrical signal 320 is proportional to the transformer winding ratio and the input voltage.

As described above, the control signal 318C turns the blocking MOSFET 336B of FIG. 3B in tandem with the operation of the primary switch 213, thus essentially matching the duty cycle of the first electrical signal 320 to prevent negative voltages from appearing at the forward MOSFET 332.

FIG. 4 also depicts a possible example of the second electrical signal 322 of FIGS. 3, 3A, and 3B. Generally, the second electrical signal 322 serves to provide synchronization or timing information for the PWM controller 310 of the DC power supply circuit 300. More specifically, the second electrical signal 322 denotes the start of each pulse of the first electrical signal 320, thus indicating the beginning of the gating window 402 of the gating circuit 302, wherein the first electrical signal 320 is passed through as the gated electrical signal 312. As displayed in FIG. 4, the leading edge of each pulse of the second electrical signal 322 coincides with the leading edge of a corresponding pulse of first electrical signal 320, while the width of each pulse of the second electrical signal 322 may be shorter than those of the first electrical signal 320. In other examples, each pulse of the second electrical signal 322 may be equal to or longer than a corresponding pulse of the first electrical signal 320. Still other implementations for the second electrical signal 322, such as those in which a leading and/or trailing edge of each pulse of the second electrical signal 322 indicates the opening of each gating window 402 for the gating circuit 302, may be utilized. Also, the voltage amplitude of the second electrical signal 322 is shown in FIG. 4 to be less than that of the first electrical signal 320, such as what might be expected in a logic or control signal within the limits of a power supply voltage Vcc, although other voltage levels for the second electrical signal 322 may be employed in alternative implementations.

The voltage level of the DC output voltage 314 generated in the DC power supply circuit 300 is dependent upon the amplitude of the first electrical signal 320 and the length of the gating window 402 (i.e., how long the first electrical signal 320 is allowed to pass through as the gated electrical signal 312). More specifically, longer gating windows 402 result in higher levels for the DC output voltage 314. As presented in FIG. 4, an example of a gated electrical signal 312A employed for a low DC output voltage 314 of 1.2 volts is a relatively short or narrow gating window 402A, while a gated electrical signal 312B for a slightly higher DC output voltage 314 of 1.5 volts is associated with a longer gating window 402B. Another gated electrical signal 312C with an even wider gating window 402C results in a DC output voltage 314 of 2.1 volts. Generally, the width of a gating window 402 will not exceed the width of each pulse of the first electrical signal 320, so that the duty cycle of the gated electrical signal 312 will not exceed the duty cycle of the first electrical signal 320, which in the case of FIG. 4 is 50 percent. In some examples, the duty cycle of the gated electrical signal 312 is on the order of 25-40 percent, and more specifically 30-35 percent, as determined by the transformer winding ratio, in order to increase the efficiency of the voltage conversion process. However, higher duty cycles of up to 50 percent may be employed in other implementations.

Figure 5:
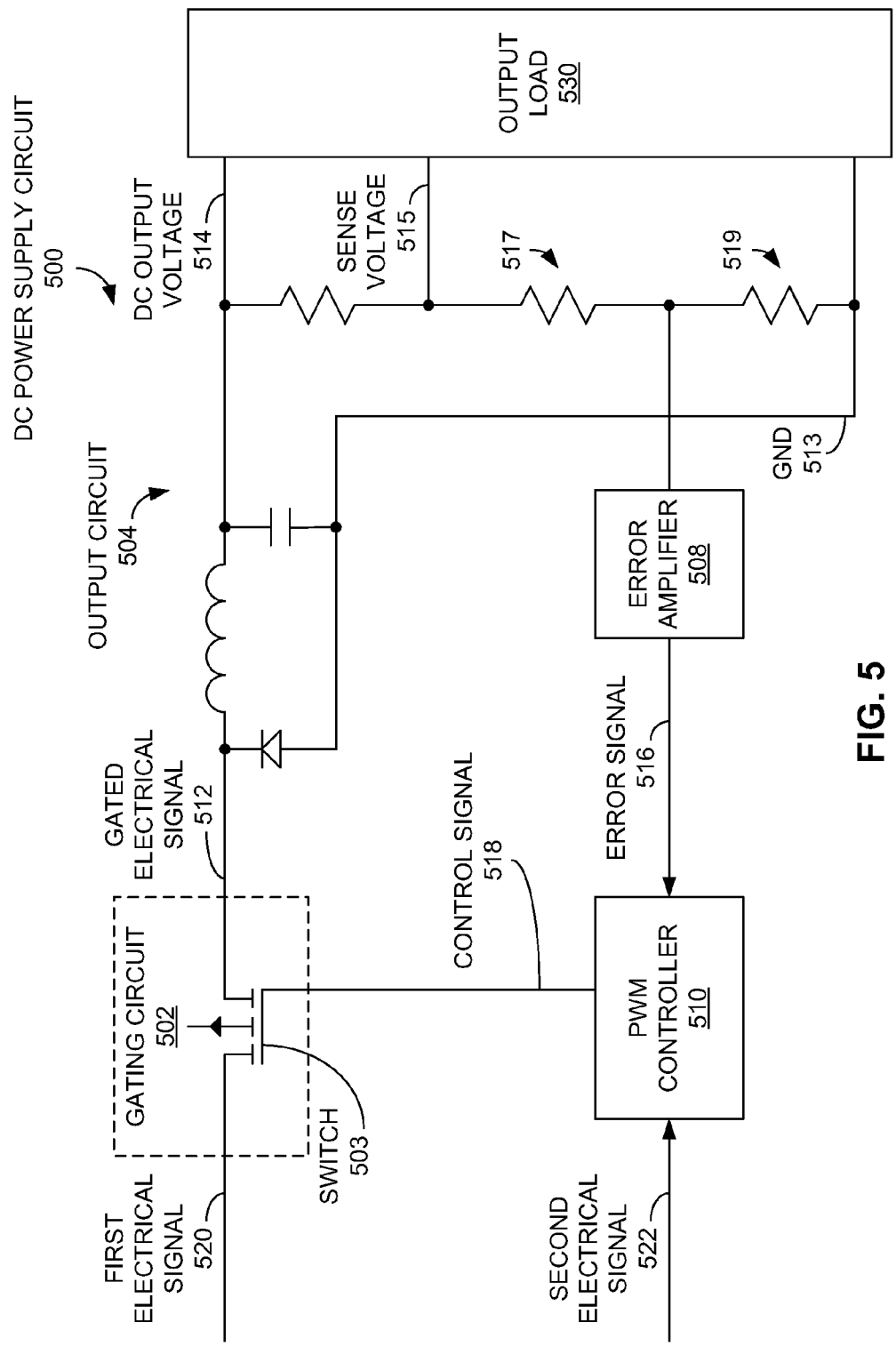
FIG. 5 is a schematic diagram of an output stage of example embodiments of the DC power supply circuit.

Another example of a DC power supply circuit 500 according to one implementation is presented in FIG. 5. As with the DC power supply circuit 300 of FIG. 3, the power supply circuit 500 includes a gating circuit 502, an output circuit 504, a PWM controller 510, and an error amplifier 508. More specifically, the gating circuit 502 is embodied as a switch 503, such as a metal-oxide-semiconductor field effect transistor (MOSFET) (as shown specifically in FIG. 5), or other electrical component, transistor, or structure that is operable as a switch. The switch 503 is operated to alternately conduct and shut off to selectively pass through the first electrical signal 520 as a gated electrical signal 512 based on the current state of a control signal 518 generated by the PWM controller 510. The control signal 518 operates in a fashion similar to the control signal 318 discussed above in conjunction with FIG. 3.

At least a portion of the output circuit 514 shown in FIG. 5 is employed to condition a sense voltage 515 returned from the output load 530. While in some embodiments the DC output voltage 514 may be monitored directly at the output of the DC power supply circuit 500, the particular implementation of FIG. 5 shows the sense voltage 515 being returned from the output load 530, thus providing the power supply circuit 500 with a more accurate indication of the DC output voltage 514 as it is received at the output load 530. As a result, the DC output voltage 514 may exhibit a narrower voltage range than what would otherwise be possible, which may be important for some electronic circuits that possess less tolerance for variations in their supply voltage.

In the output circuit 504 of FIG. 5, the sense voltage 515 is voltage divided via two resistors 517, 519, with the resulting voltage being presented to the error amplifier 508. In turn, the error amplifier 508 compares the resulting voltage to a reference voltage 342 (see FIG. 3) to generate a differential voltage, which may then be amplified and delivered to the PWM controller 510 as an error signal 516. The error signal 516 is then employed as described above with respect to the error signal 316 of FIG. 3. In some alternative embodiments, the error signal 516 may be a digital signal instead of an analog signal.

While FIG. 5 illustrates a single specific embodiment of a DC power supply circuit 500, other embodiments of such a circuit that involve different circuit components and configurations for both the gating circuit 502 and the output circuit 504 while providing the functionality described herein are also possible while remaining within the scope of the disclosure. Further, different configurations for each of multiple DC power supply circuits that are employed within the same overall power supply may be possible, depending on the specific voltage and current requirements for each DC power supply voltage being generated.

Figure 6A:
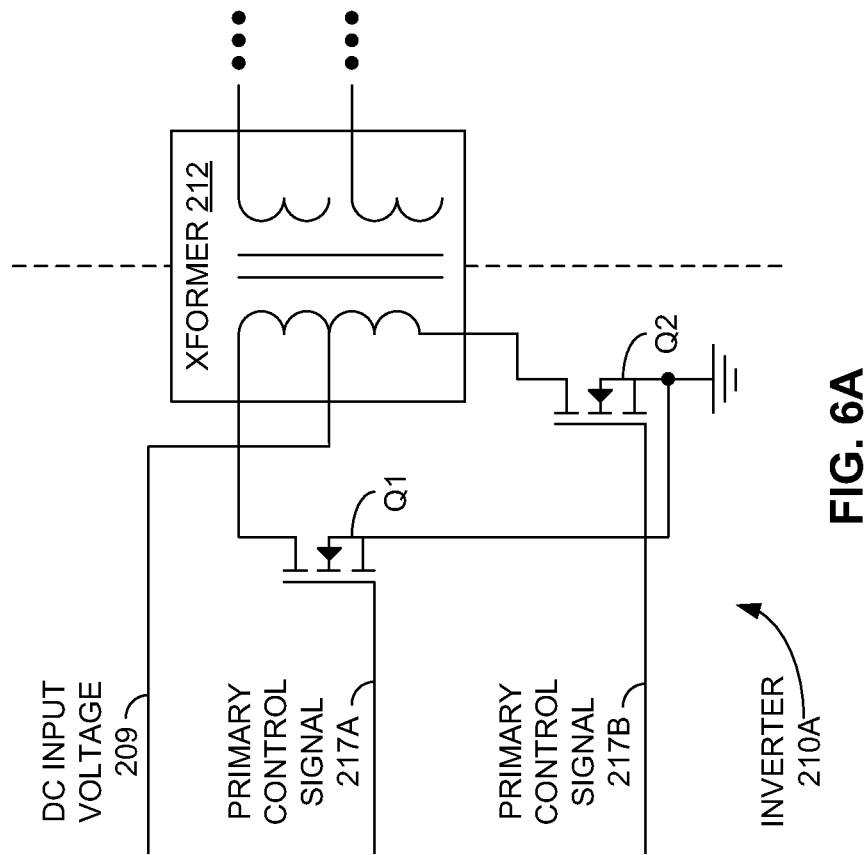
FIGS. 6A, 6B, and 6C are schematic diagrams of alternative inversion circuit embodiments for a power supply.
Figure 6B:
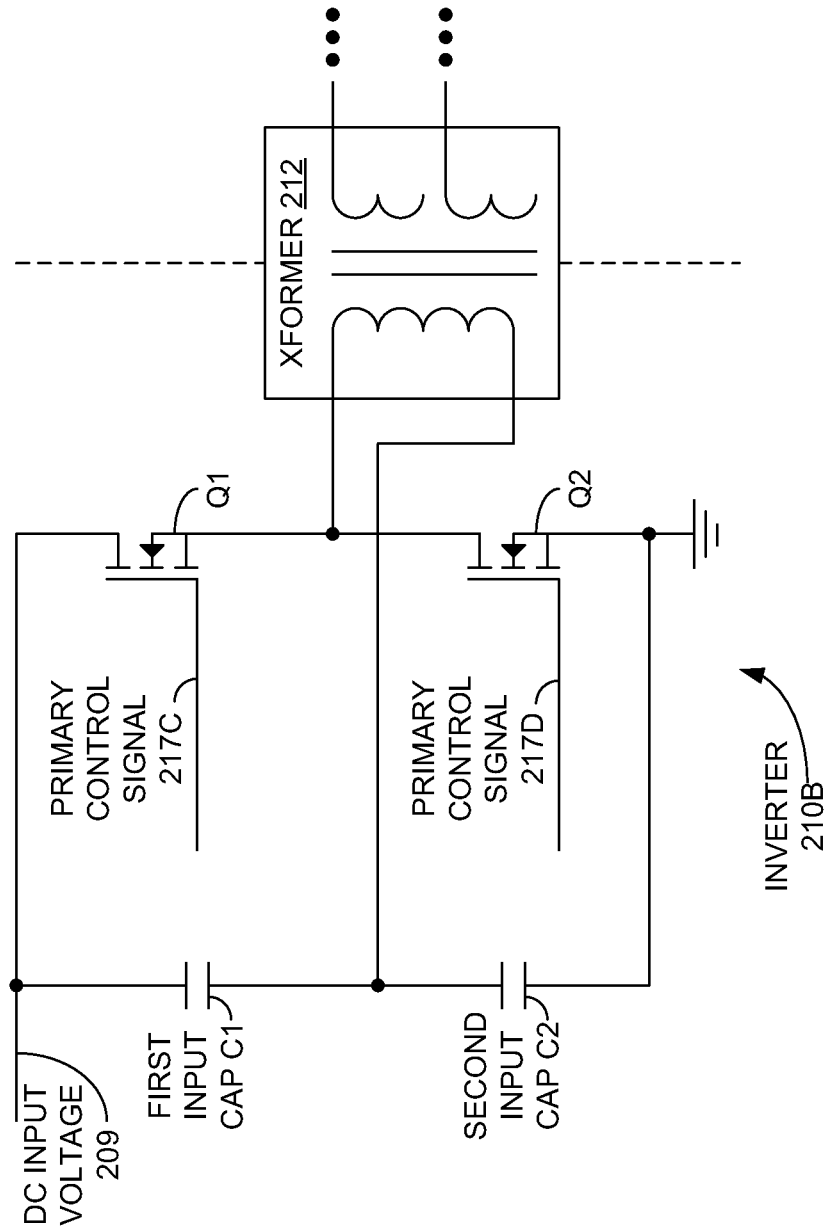
Figure 6C:
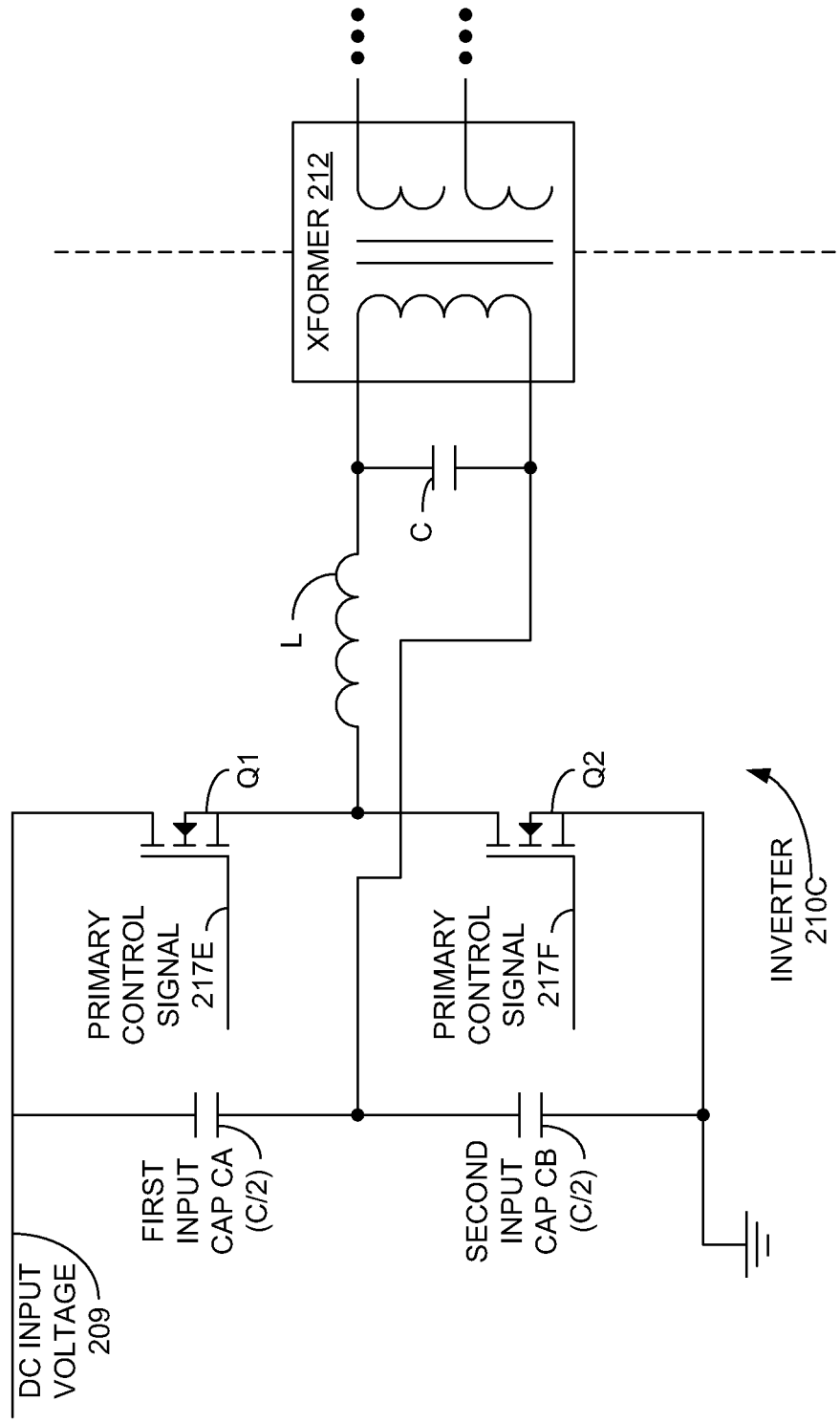

Various alternative implementations of the inverter 210 of FIG. 2 are presented as inverters 210A, 210B, and 210C in FIGS. 6A, 6B, and 6C, respectively. In each of these embodiments, the inverter 210A, 210B, 210C causes the transformer 212 to operate in two quadrants of the BH loop (i.e., the hysteresis loop plotting magnetic flux density (B) versus the magnetizing force (H)), while allowing the size of the transformer 212 to be reduced compared to the embodiment of FIG. 2. Furthermore, two DC power supply circuits 300C and 300D compatible with the alternatives of FIGS. 6A, 6B, and 6C are illustrated in FIGS. 7A and 7B.

Figure 7A:
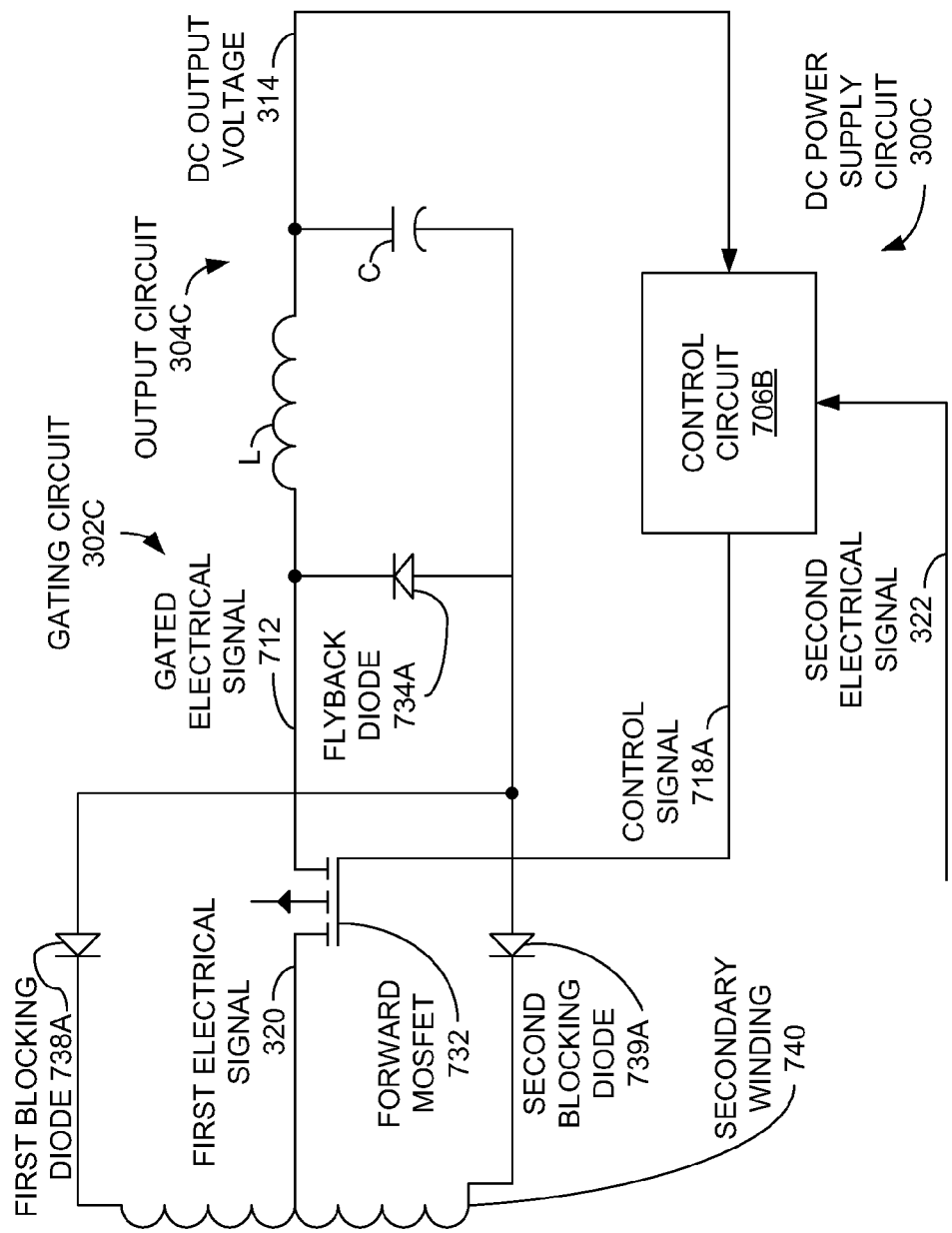
FIGS. 7A and 7B are schematic diagrams of alternate embodiments of DC power supply circuits as shown in FIG. 2 that are compatible with the inversion circuits of FIGS. 6A, 6B, and 6C.

Regarding FIG. 7A, the DC power supply circuit 300C therein includes two blocking diodes 738A, 739A, a forward MOSFET 732, and a flyback diode 734A. An inductor L and a capacitor C act jointly as a low-pass filter for generating the DC output voltage 314. The control circuit 706A operates as an error amplifier and a PWM controller (not explicitly shown in FIGS. 7A and 7B), as described above with respect to FIG. 3. Also as described earlier, the error amplifier integrates the difference between the output voltage and a reference voltage 342 (see FIG. 3), while the PWM controller generates gate pulse synchronization via a control signal 718A driving the forward MOSFET 732 using the second electrical signal 322

Figure 7B:
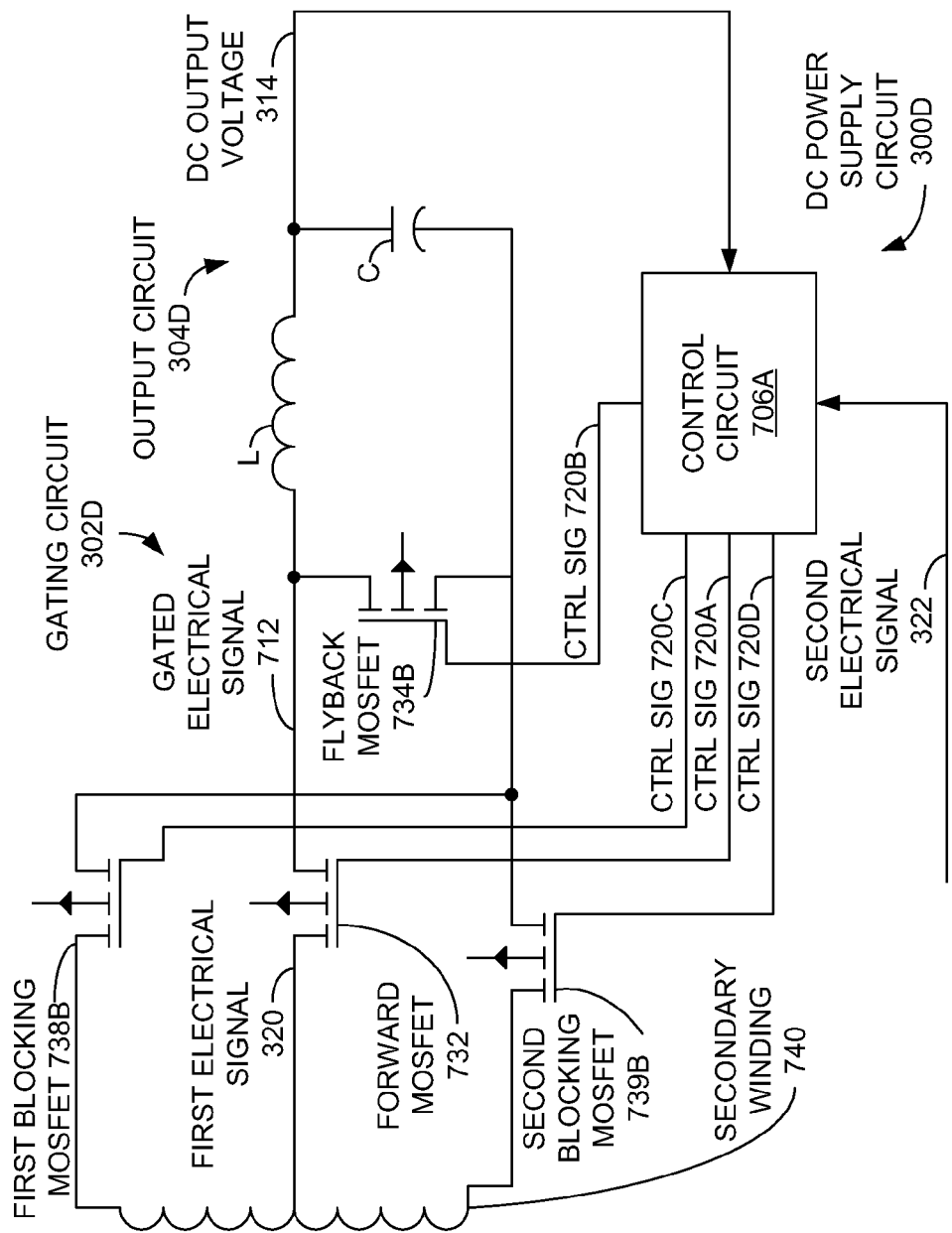

In FIG. 7B, the blocking diodes 738A, 739A and the flyback diode 734A are replaced by blocking MOSFETs 738B, 739B and a flyback MOSFET 734B, respectively. The forward MOSFET 732 is controlled via a first control signal 720A, the flyback MOSFET 734B is controlled with a second control signal 720B, and the blocking MOSFETs 738B, 739B are driven by a third control signal 720C and a fourth control signal 720D, respectively. The use of the blocking MOSFETs 738B, 739B and the flyback MOSFET 734B in place of their diode counterparts help reduce conduction loss, thus increasing power conversion efficiency.

Returning to FIG. 6A, the inverter 210A illustrated therein is termed a "push-pull converter". Compared to the embodiment of FIG. 2, the push-pull converter 210A may offer a smaller transformer 212 size, as well as smaller output inductors and capacitors in each of the DC power supply circuits 300. Since the output essentially constitutes a full bridge, the total number of components may be increased over the embodiment of FIG. 2, but the overall footprint of the power supply may be decreased due to the smaller components utilized.

In operation, when primary control signals 217A and 217B cause the MOSFET Q1 of the inverter 210A to turn on and the MOSFET Q2 to turn off in complementary fashion during the first half of each cycle, as determined by the primary control signals 217A and 217B, current flows from the DC input voltage 209 through the transformer 212 and MOSFET Q1. Presuming the use of the DC power supply circuit 300C of FIG. 7A, the reflected voltage on the secondary side 740 of the transformer 212 holds the drain of the forward MOSFET 732 to a positive voltage and the cathode of the first blocking diode 738B to a negative voltage. During the second half of the cycle, in which MOSFET Q1 is turned off, and MOSFET Q2 is turned on, current flows from the DC input voltage 209 through the transformer 212 and the MOSFET Q2. In that case, the reflected voltage on the secondary side 740 of the transformer 212 holds the drain of the forward MOSFET 732 positive while the cathode of the second blocking diode 739A is negative. Thus, an alternating voltage is developed at the drain of the forward MOSFET 732, which is gated on and off according to the control signal 718A to generate the gated electrical signal 712, as is described above with respect to FIGS. 3, 3A, and 3B.

In FIG. 6B, another inverter 210B, known as a "half-bridge converter", uses two MOSFETs Q1 and Q2, which are switched on and off in a complementary manner to generate the necessary AC voltage at the primary winding of the transformer 212. Also included are two input capacitors C1 and C2.

In the operation of the inverter 210B, when MOSFET Q1 is on and MOSFET Q2 is off, current flows from the DC input voltage 209 through the MOSFET Q1, the transformer 212, and the second capacitor C2. As a result, the reflected voltage across the secondary winding 740 of the transformer 212 causes the drain of the forward MOSFET 732 to be held to a positive voltage, while the cathode of the second blocking diode 739A is driven negative. Oppositely, when MOSFET Q1 is off and MOSFET Q2 is ON, current flows from the DC input voltage 209 through the first input capacitor C1, the transformer 212, and MOSFET Q2. Accordingly, the reflected voltage across the secondary winding 740 of the transformer 212 during this half-cycle causes the drain of the forward MOSFET 732 to be held to a positive voltage, while the cathode of the first blocking diode 738A goes negative. Therefore, an alternating voltage is developed at the drain of the forward MOSFET 732, which is alternately gated on and off by the control signal 718A to produce the gated electrical signal 712, as is described above in reference to FIGS. 3, 3A, and 3B.

FIG. 6C depicts another inverter 210C, called a "resonant converter". With the DC input voltage 209 being switched into an L-C (inductor-capacitor) network coupled with the primary winding of the transformer 212 at a 50% duty cycle via complementary action of two MOSFETs Q1 and Q2, switching losses are exceptionally low, thus increasing the efficiency of the overall power supply 200. Also included are a first input capacitor CA and a second input capacitor CB, each of which has a value of approximately half the capacitance value of the capacitor C of the L-C network. Generally, as with the embodiments of FIGS. 6A and 6B, the duty cycle at which the MOSFETs Q1, Q2 are operated is 50 percent. Additionally, the frequency at which the MOSFETs Q1, Q2 are operated is greater than the resonant frequency of the L-C network.

In operating the inverter 210C, when MOSFET Q1 turns on and MOSFET Q2 turns off, current flows from the DC input voltage 209 through the MOSFET Q1, the resonant LC circuit, and the second input capacitor CB. This action results in a reflected voltage across the secondary winding 340 of the transformer 212, causing the drain of the forward MOSFET 732 to go positive while the cathode of the first blocking diode 738A is held at a negative voltage. During the second half-cycle, when MOSFET Q1 is off and MOSFET Q2 is on, current flows from the DC input voltage 209 through the first input capacitor CA, the resonant L-C network, and the MOSFET Q2. The reflected voltage across the secondary winding 340 causes the drain of the forward MOSFET 732 to be held positive while the cathode of the second blocking diode 739A is driven to a negative voltage. Again, an alternating voltage at the forward MOSFET 732 results, which is selectively gated via the forward MOSFET 732 as controlled via the control signal 718A generated in the control circuit 706A to produce the gated electrical signal 712.

In each of the embodiments described above, any or all of the control circuitry provided, including but not limited to the control circuit 216 of FIGS. 2 and 2A, the control circuit 306 of FIG. 3, the control circuit 306A of FIG. 3A, the control circuit 306B of FIG. 3B, the control circuit 706A of FIG. 7A, and the control circuit 706B of FIG. 7B, may be incorporated into one or more programmable components, such as field-programmable gate arrays (FPGAs), to reduce the overall footprint of the power supply embodiments disclosed herein.

At least some embodiments as described herein thus provide a power supply with multiple DC output voltages via a single voltage conversion stage after the transformer. More specifically, an AC signal output from the transformer is converted directly into several different DC output voltages, as opposed to converting the AC signal from the transformer into an intermediate DC voltage from which the multiple DC output voltages are derived, as is the case with many current power supplies. This single voltage conversion process may result in a smaller power supply cost and footprint as a consequence of fewer, smaller, and less expensive electronic components necessary to construct such a power supply than what was previously possible. For example, a smaller power transformer and fewer capacitors are necessary in the embodiments described above due to the use of fewer conversion stages and the lack of a flyback converter. The amount of capacitance required is further reduced due to the lack of a negative resistance effect that often results from multiple DC output voltages being generated from another DC output voltage.

Further, as described above, each of the DC power supply circuits being driven by the AC signal from the transformer is configured to regulate its DC output voltage. As a result, unlike many other power supply systems, feedback from the secondary side of the transformer back to the primary side is not required. Instead, a single synchronization signal is forwarded across the primary-secondary boundary to each of the DC power supply circuits, thus allowing the AC signal from the transformer to run open loop in a forward conversion mode.

By performing the voltage regulation in each individual DC power supply circuit, each DC output voltage may be individually well-regulated. Such a power supply design represents an advance over other power supply systems in which a single intermediate DC voltage of a two-stage conversion power supply is monitored and regulated, resulting in only one DC output voltage being well regulated.

Additionally, regulating the level of each DC output voltage locally at each DC power supply circuit allows the monitoring of the output voltages to occur in relatively close physical proximity to the load consuming the power, resulting in more accurate regulation of the DC output voltage at the load. In some implementations, a voltage sense signal may be returned directly from the load to the DC power supply circuit, thus enhancing the accuracy of the voltage regulation by providing an accurate depiction of the voltage experienced at the load.

While several embodiments have been discussed herein, other implementations encompassed by the scope of the disclosure are possible. For example, while various embodiments have been described largely within the context of television receivers or set-top boxes, other electronic devices, including but not limited to televisions, CD and DVD players, digital video recorders, general-purpose computer systems, and gaming systems, may incorporate various aspects of the functionality described above to similar effect. In addition, aspects of one embodiment disclosed herein may be combined with those of alternative embodiments to create further implementations of alternative embodiments. Therefore, while various embodiments have been described in the context of specific embodiments, such descriptions are provided for illustration and not limitation. Accordingly, the proper scope of the present disclosure is delimited only by the following claims and their equivalents.

The invention claimed is:

1. A method of supplying direct-current (DC) power, the method comprising:
    receiving a first electrical signal at a gating circuit from a secondary winding of a transformer, wherein the gating circuit comprises:
        a first gated transistor that has a drain and an output,
            wherein the drain of the first gated transistor is coupled to a first terminal of the secondary winding of the transformer, and
            wherein the first, gated transistor is gated using a first control signal;
        a second gated transistor that has a drain and an output,
            wherein the drain of the second gated transistor is coupled the output of the first gated transistor, and
            wherein the second gated transistor is gated using a second control signal, wherein the second control signal is complementary to the first control signal such that the second gated transistor is not gated while the first gated transistor is gated and such that the second gated transistor is gated while the first gated transistor is not gated; and
        a third gated transistor that has a drain and an output,
            wherein the drain of the third gated transistor is coupled to the output of the second gated transistor and the output of the third gated transistor is coupled to a second terminal of the secondary winding of the transformer, and
            wherein the third gated transistor is gated using a third control signal,
        wherein the first electrical signal is defined by a leading edge and alternates between a high voltage and a low voltage according to a constant duty cycle;
    receiving a second electrical signal synchronized with the first electrical signal,
        wherein the second electrical signal is received at a controller that generates the first control signal, the second control signal, and the third control signal,
        wherein the second electrical signal is received from a pulse transformer,
        wherein the pulse transformer outputs the second electrical signal based on a primary control signal received from a square wave generator control circuit such that a leading edge of the second electrical signal corresponds to the leading edge of the primary control signal,
        wherein the primary control signal turns on and turns off a switch connected between a terminal of a primary winding of the transformer and a ground reference such that the leading edge of the first electrical signal corresponds to the leading edge of the second electrical signal, and such that the constant duty cycle of the first electrical signal corresponds to a duty cycle of the second electrical signal;
    gating the third gated transistor using the third control signal,
        wherein a leading edge of the third control signal occurs when a leading edge of the second electrical signal occurs, and
        wherein a duty cycle of the third control signal is the same as the constant duty cycle of the first electrical signal;
    gating the first gated transistor using the first control signal so that the first electrical signal is gated to produce a gated electrical signal with a duty cycle less than the duty cycle of the first electrical signal;
    filtering the gated electrical signal output from the first gated transistor to generate a DC output voltage;
    determining a difference between the generated DC output voltage and a reference DC voltage; and
    controlling the duty cycle of the gated electrical signal by controlling the gating of the first electrical signal based on the difference.

2. The method of claim 1, wherein:
    the first electrical signal comprises a square wave signal with a duty cycle of fifty percent.

3. The method of claim 1, further comprising generating the first electrical signal, wherein generating the first electrical signal comprises:
    rectifying and filtering an alternating-current (AC) input voltage to generate a DC input voltage; and
    inverting the DC input voltage to produce the first electrical signal.

4. The method of claim 1, wherein:
    the second electrical signal comprises a voltage transition coinciding with a voltage transition of the first electrical signal for each period of the first electrical signal; and
    the gating of the first electrical signal is timed based on a pulse width of the second electrical signal.

5. The method of claim 1, wherein:
    the generated DC output voltage is sensed at a circuit load receiving the generated DC output voltage.

6. The method of claim 1, wherein gating the first electrical signal comprises:
    for each period of the first electrical signal, passing the high voltage of the first electrical signal for filtering beginning at the transition of the first electrical signal from the low voltage to the high voltage; and
    for each period of the first electrical signal, preventing the first electrical signal from filtering beginning prior to a transition of the first electrical signal from the high voltage to the low voltage.

7. The method of claim 6, wherein controlling the gating of the first electrical signal comprises:
    for each period of the first electrical signal, altering a timing of the beginning of the blocking of the first electrical signal based on the difference.

8. A direct-current (DC) power supply circuit, comprising:
a gating circuit configured to receive a first electrical signal alternating between a high voltage and a low voltage at a constant duty cycle, the gating circuit comprising:
a first gated transistor,
wherein the first gated transistor is defined by an output and a drain,
wherein the drain of the first gated transistor is connected to a first terminal of a secondary winding of a transformer,
wherein the first electrical signal is received at the drain from the first terminal of the secondary winding, and
wherein the first gated transistor is configured to gate the first electrical signal according to a first control signal to produce a gated electrical signal at the output of the first gated transistor;
a second gated transistor,
wherein the second gated transistor is defined by an output and a drain,
wherein the drain of the second gated transistor is connected to the output of the first gated transistor,
wherein the second gated transistor is configured to gate according to a second control signal, and
wherein the second control signal is complementary to the first control signal such that such that the second gated transistor and the first gated transistor are not concurrently gated; and
a third gated transistor,
wherein the third gated transistor is coupled between the output of the second gated transistor and a second terminal of the secondary winding of the transformer, and
wherein the third gated transistor is gated using a third control signal;
an output circuit configured to filter the gated electrical signal to generate a DC output voltage; and
a control circuit configured to:
receive the generated DC output voltage,
compare the generated DC output voltage to a reference voltage,
receive a second electrical signal from a pulse transformer,
Where the pulse transformer outputs the second electrical signal based on a primary control signal received from a square wave generator control circuit such that a leading edge of the second electrical signal occurs when the leading edge of the primary control signal occurs,
wherein the primary control signal turns on and turns off a switch connected between a terminal of a primary winding of the transformer and a ground reference such that a leading edue of the first electrical signal occurs when the leading edge or the second electrical signal occurs, and such that the constant duty cycle of the first electrical signal is the same as a duty cycle of the second electrical signal, and
wherein the second electrical signal is synchronized with the first electrical signal,
generate the first control signal based on the comparison of the generated DC output voltage to the reference voltage, and based on the second electrical signal,
wherein the first control signal is communicated to the first gated transistor, and wherein the gated electrical signal has a duty cycle less than the constant duty cycle of the first electrical signal;
generate the second control signal that is complementary to the first control signal, wherein the second control signal is communicated to the second gated transistor; and
generate the third control signal,
wherein a leading edge of the third control signal occurs when the leading edge of the second electrical signal occurs,
wherein a duty cycle of the third control signal is the same as the constant duty cycle of the first electrical signal, and
wherein the third control signal is communicated to the third gated transistor.

9. The DC power supply circuit of claim 8, wherein the control circuit comprises:
an error amplifier configured to generate an error signal based on the comparison between the generated DC output voltage and the reference voltage; and
a pulse-width-modulation (PWM) controller configured to generate the primary control signal, wherein the primary control signal comprises a series of pulses, wherein each pulse of the primary control signal is initiated by a voltage transition of the second electrical signal, and wherein a width of each pulse is based on the error signal.

10. The DC power supply circuit of claim 8, wherein:
the duty cycle of the first control signal is no greater than a duty cycle of the first electrical signal.

11. The DC power supply circuit of claim 8, further comprising:
a blocking component configured to block a low voltage level from reaching the gating circuit.

12. The DC power supply circuit of claim 11, wherein:
operation of the blocking component is activated by the second electrical signal.

13. The DC power supply circuit of claim 8, wherein the control circuit is configured to generate the second control signal when the output current reaches its rated ripple current value.

14. A multiple-output-voltage direct-current (DC) power supply, comprising:
a plurality of DC power circuits, wherein each of the power circuits are coupled to a first terminal of a secondary winding of a transformer and are configured to:
receive a first electrical signal from a first terminal of the secondary winding of the transformer,
wherein first electrical signal is periodically alternating between a high voltage and a low voltage according to a constant duty cycle,
receive a second electrical signal from a pulse transformer that is synchronized with the first electrical signal,
generate a separate DC output voltage based on the first electrical signal and the second electrical signal, and
regulate a voltage level of the separate DC output voltage; and
a driving circuit configured to generate the first electrical signal and the second electrical signal, comprising;
a switch control signal generator that outputs a primary control signal,
wherein the pulse transformer receives the primary control signal, and
wherein the pulse transformer outputs the second electrical signal based on the received primary control signal such that a leading edge of the second electrical signal occurs when the leading edge of the primary control signal occurs, and such that a duty cycle of the second electrical signal is the same as a duty cycle of the primary control signal; and a switch connected between a terminal of a primary winding of the transformer and a ground reference, wherein the switch turns on and turns off in response to receiving the primary control signal from the switch control signal generator, wherein the first electrical signal is at the high voltage when the switch is turned off and is at the low voltage when the switch is turned on, and wherein a leading edge of the first electrical signal occurs when the leading edge of the primary control signal occurs, and such that the constant duty cycle of the first electrical signal is the same as the duty cycle of the primary control signal.

15. The multiple-output-voltage DC power supply of claim 14, further comprising:
a rectifier configured to rectify an input AC signal to produce a rectified AC input signal; and
a filter circuit configured to filter the rectified AC input signal to produce an input DC signal that is input into the transformer.

16. The multiple-output-voltage DC power supply of claim 15, wherein:
the filter circuit is configured to produce a voltage level for the input DC signal that is half of a peak voltage level of the input AC signal.

17. The multiple-output-voltage DC power supply of claim 14, wherein:
the switch control signal generator is configured to alter a duty cycle of the primary switch control signal over time.

18. The multiple-output-voltage DC power supply of claim 14, further comprising:
an electrical isolation circuit configured to produce the second electrical signal from the primary switch control signal.

19. The multiple-output-voltage DC power supply of claim 14, wherein at least one of the DC power circuits comprises:
a chopping circuit configured to receive the first electrical signal and to chop the first electrical signal according to an internal control signal to produce a chopped electrical signal;
an output circuit configured to filter the chopped electrical signal to produce the DC output voltage; and
a control circuit configured to receive the generated DC output voltage, to compare the generated DC output voltage to a reference voltage, to receive the second electrical signal, and to generate the internal control signal based on the comparison and the second electrical signal.

20. The multiple-output-voltage DC power supply of claim 19, wherein at least one of the DC power circuits further comprises:
a pulse-width-modulation (PWM) controller configured to generate the internal control signal, wherein the internal control signal comprises a pulse train and has a frequency equal to a frequency of the first electrical signal, wherein each pulse of the internal control signal is initiated by a voltage transition of the second electrical signal, and wherein a width of each pulse is based on the comparison and is no greater than a width of a corresponding pulse of the first electrical signal.

21. The multiple-output-voltage DC power supply of claim 20, wherein at least one of the DC power circuits further comprises:
an error amplifier configured to generate an error signal based on the comparison between the generated DC output voltage and the reference voltage,
wherein the PWM controller is configured to modulate the width of each pulse of the internal control signal based on the error signal.

22. The multiple-output-voltage DC power supply of claim 14, wherein at least one of the DC power circuits further comprises:
a first gated transistor,
wherein the first gated transistor is defined by an output and a drain,
wherein the drain of the first gated transistor is connected to a first terminal of a secondary winding of a transformer,
wherein the first electrical signal is received at the drain from the first terminal of the secondary winding, and
wherein the first gated transistor is configured to gate the first electrical signal according to a first control signal to produce a gated electrical signal at the output of the first gated transistor;
a second gated transistor,
wherein the second gated transistor is defined by an output and a drain,
wherein the drain of the second gated transistor is connected to the output of the first gated transistor,
wherein the second gated transistor is configured to gate according to a second control signal, and
wherein the second control signal is complementary to the first control signal such that such that the second gated transistor and the first gated transistor are not concurrently gated; and
a third gated transistor,
wherein the third gated transistor is coupled between the output of the second gated transistor and a second terminal of the secondary winding of the transformer, and
wherein the third gated transistor is gated using a third control signal.

* * * * *